United States Patent [19]

Nibby, Jr. et al.

[11] 4,388,684

[45] Jun. 14, 1983

[54] APPARATUS FOR DEFERRING ERROR DETECTION OF MULTIBYTE PARITY ENCODED DATA RECEIVED FROM A PLURALITY OF INPUT/OUTPUT DATA SOURCES

[75] Inventors: Chester M. Nibby, Jr., Peabody; Robert B. Johnson, Billerica, both of Mass.

[73] Assignee: Honeywell Information Systems Inc., Waltham, Mass.

[21] Appl. No.: 248,107

[22] Filed: Mar. 27, 1981

[51] Int. Cl.³ .............................................. G06F 11/10
[52] U.S. Cl. ...................................... 364/200; 371/38
[58] Field of Search ... 364/200 MS File, 900 MS File; 371/38, 49

[56] References Cited

U.S. PATENT DOCUMENTS

| | | | |
|---|---|---|---|
| 3,579,200 | 5/1971 | Davis et al. | 364/900 |
| 3,836,957 | 9/1974 | Duke et al. | 371/38 |
| 3,905,023 | 9/1975 | Perpiglia | 364/200 |
| 4,072,853 | 2/1978 | Barlow et al. | 371/38 |
| 4,355,391 | 10/1982 | Alsop | 371/38 |
| 4,358,848 | 11/1982 | Patel | 371/38 |

*Primary Examiner*—Harvey E. Springborn
*Attorney, Agent, or Firm*—Faith F. Driscoll; Nicholas Prasinos

[57] ABSTRACT

Apparatus is included in a main memory subsystem of a data processing system which receives multibyte data from a plurality of input/output devices connected to a common bus. During a write cycle of operation, a device applies the multibyte data signals together with associated parity bits for writing into an addressed storage location of memory. During the write cycle, error encoder circuits generate check code bits from the multibyte data and parity bits which are coded to signal selectively the presence of a multibyte uncorrectable error condition in accordance with the parity bits from a device. During a read cycle of operation, error detection and correction decoder circuits connected to the memory in response to the data and check bits read out from an addressed location are operative to generate a number of syndrome bits. These bits have a predetermined characteristic for indicating the existence of an uncorrectable error condition when one or more data bytes were in error and there was a single bit error in memory.

36 Claims, 14 Drawing Figures

Fig. 4a.

|    | 0 | 1 | 2 | 3 | 4 | 5 | 6 | 7 | 8 | 9 | 10 | 11 | 12 | 13 | 14 | 15 | *BPE |
|----|---|---|---|---|---|---|---|---|---|---|----|----|----|----|----|----|------|
| C0 | 1 | 1 | 1 | 1 | 1 | 1 | 1 | 1 | 1 | 1 |    |    |    |    |    |    | 1    |
| C1 |   |   |   |   |   |   |   | 1 | 1 | 1 | 1  | 1  | 1  | 1  | 1  | 1  | 1    |
| C2 |   |   | 1 | 1 | 1 | 1 |   |   |   |   |    |    |    | 1  | 1  | 1  | 1    |
| C3 | 1 | 1 |   | 1 |   |   | 1 | 1 |   |   | 1  | 1  |    | 1  |    |    |      |
| C4 | 1 |   | 1 |   | 1 |   | 1 |   | 1 |   | 1  |    | 1  |    | 1  |    |      |
| C5 |   | 1 | 1 |   |   | 1 | 1 |   |   | 1 |    | 1  | 1  |    | 1  |    |      |

*BPE = BUS PARITY ERROR

Fig. 4b.

|    | 0 | 1 | 2 | 3 | 4 | 5 | 6 | 7 | 8 | 9 | 10 | 11 | 12 | 13 | 14 | 15 | BPE | C0 | C1 | C2 | C3 | C4 | C5 |
|----|---|---|---|---|---|---|---|---|---|---|----|----|----|----|----|----|-----|----|----|----|----|----|----|
| S0 | 1 | 1 | 1 | 1 | 1 | 1 | 1 | 1 | 1 | 1 |    |    |    | 1  | 1  |    |     |    |    |    |    |    |    |
| S1 |   |   |   |   |   |   |   | 1 | 1 | 1 | 1  | 1  | 1  | 1  | 1  | 1  | 1   |    | 1  |    |    |    |    |
| S2 |   |   | 1 | 1 | 1 | 1 |   |   |   |   |    |    |    | 1  | 1  | 1  | 1   |    |    | 1  |    |    |    |
| S3 | 1 | 1 |   | 1 |   |   | 1 | 1 |   |   | 1  | 1  |    | 1  |    |    |     |    |    |    | 1  |    |    |
| S4 | 1 |   | 1 |   | 1 |   | 1 |   | 1 |   | 1  |    | 1  |    | 1  |    |     |    |    |    |    | 1  |    |
| S5 |   | 1 | 1 |   |   | 1 | 1 |   |   | 1 |    | 1  | 1  |    | 1  |    |     |    |    |    |    |    | 1  |

Fig. 4c.

|    | 0 | 1 | 2 | 3 | 4 | 5 | 6 | 7 | 8 | 9 | 10 | 11 | 12 | 13 | 14 | 15 | C0 | C1 | C2 | C3 | C4 | C5 |
|----|---|---|---|---|---|---|---|---|---|---|----|----|----|----|----|----|----|----|----|----|----|----|
| S0 | 1 | 1 | 1 | 1 | 1 | 1 | 1 | 1 | 1 | 1 |    |    |    | 1  |    |    | 1  |    |    |    |    |    |
| S1 |   |   |   |   |   |   |   | 1 | 1 | 1 | 1  | 1  | 1  | 1  | 1  | 1  |    | 1  |    |    |    |    |
| S2 |   |   | 1 | 1 | 1 | 1 |   |   |   |   |    |    |    | 1  | 1  | 1  |    |    | 1  |    |    |    |
| S3 | 1 | 1 |   | 1 |   |   | 1 | 1 |   |   | 1  | 1  |    | 1  |    |    |    |    |    | 1  |    |    |
| S4 | 1 |   | 1 |   | 1 |   | 1 |   | 1 |   | 1  |    | 1  |    | 1  |    |    |    |    |    | 1  |    |
| S5 |   | 1 | 1 |   |   | 1 | 1 |   |   | 1 |    | 1  | 1  |    | 1  |    |    |    |    |    |    | 1  |

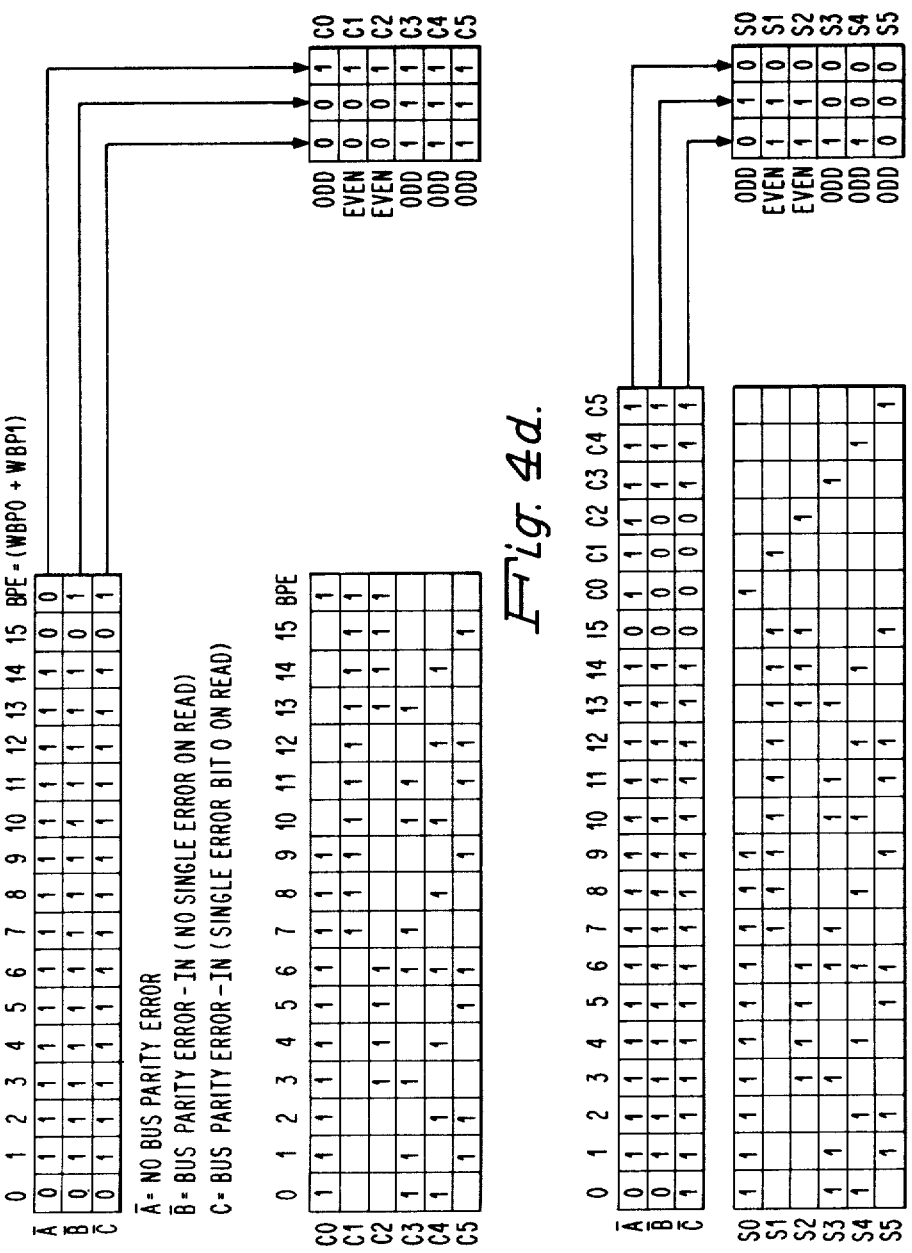

APPARATUS FOR DEFERRING ERROR DETECTION OF MULTIBYTE PARITY ENCODED DATA RECEIVED FROM A PLURALITY OF INPUT/OUTPUT DATA SOURCES

REFERENCED COPENDING PATENT APPLICATIONS

1. "Sequential Word Aligned Address Apparatus", invented by Robert B. Johnson, Chester M. Nibby, Jr. and Dana W. Moore, Ser. No. 110,521, filed on Jan. 8, 1980, and assigned to the same assignee as named herein.

2. "Soft Error Rewrite Control System", invented by Robert B. Johnson and Chester M. Nibby, Jr., Ser. No. 172,485, filed on July 25, 1980, issued as U.S. Pat. No. 4,369,510 on Jan. 18, 1983, and assigned to the same assignee as named herein.

BACKGROUND OF THE INVENTION

1. Field of Use

This invention relates generally to data processing systems and more particularly to error detection and correction apparatus included within the memory of a data processing system.

2. Prior Art

It is well known to utilize metal oxide semiconductor field effect transistor (MOSFET) memory elements in main memory systems. Since such memories are volatile in nature and require continual restoration of the stored information, error detection and correction apparatus are normally included within such memory systems for ensuring the integrity of the stored information. Generally, main storage systems utilize a modified Hamming code for single error correction/double error detection. Normally, such codes increase significantly the number of memory circuits.

In order to increase memory reliability notwithstanding attendant increases in error detection and correction circuits, at least one system utilizes codes which improve upon the modified Hamming SEC/DED codes and simplify the memory circuit implementation as well as provide faster and better error detection capability. This arrangement is described in a paper "A Class of Optimal Minimum Odd-Weight-Column SEC/DED Codes" by M. Y. Hsiao which appears in the publication "IBM Journal of Research and Development", July, 1970. The construction of such codes is described in terms of a parity check matrix H. The selection of the columns of the H matrix for a given (n, k) code is based upon the following constraints:

1. Every column should have an odd number one's;
2. The total number of one's in the H matrix should be a minimum; and,
3. The number of one's in each row of the H matrix should be made equal or as close as possible to the average number.

Errors are indicated by analyzing the syndromes formed from the data and coded check bits. An odd number of syndrome bits indicates a single error while an even number of syndrome bits indicate a double or uncorrectable error.

The above arrangement was found unsuitable for use in data processing systems where data bytes are transferred by a plurality of devices along a common bus at a rapid rate. The reason was that by the time the parity encoded data word could be checked, the data device applying the data will have relinquished its control of the bus. Hence, requiring the sending device to be connected to the bus until checking was complete results in a reduction in system throughput.

In order to overcome this disadvantage, the apparatus disclosed in U.S. Pat. No. 4,072,853 was included in a memory subsystem so as to force selectively the check code bits written into memory to predetermined states when the parity bits of unchecked data received from a device indicated that the data is in error. This enabled the apparatus to signal that the data was in error when it was originally written into memory upon being read out during a subsequent read cycle of operation.

It was found that there were instances when a bus parity error could go undetected. This occurred when there was a single bit error in an addressed memory location which combined with the bus parity error to modify the coded check bits so as to cause the bus parity condition to go undetected. While this was not a major problem in the past system, the higher frequency of soft error occurrences due in part to alpha particle contamination in MOSFET memories was found to render the error detection capability of such memory systems less reliable. For a more detailed discussion of soft errors, reference may be made to the copending patent application of Robert B. Johnson and Chester M. Nibby, Jr., titled "Soft Error Rewrite Control System", Ser. No. 172,485, filed on July 25, 1980. Also, the system was unable to detect multibyte signals.

In addition to the above, the system disclosed in U.S. Pat. No. 3,836,957 provides for detection of single bus byte parity errors by modifying the generated check code bits to enable recreation of a bus byte parity error for subsequent detection. Also, IBM Technical Disclosure Bulletin titled "Implied Retention of Byte Parity Bits When Using Error Correcting Codes" by R. J. Stanton, et al., published in Vol. 10, No. 7, dated December 1967 discloses apparatus which modifies the generated check bits which also enables recreation of a bus byte parity error.

It was noted that in the system disclosed in U.S. Pat. No. 3,836,957, the occurrence of bus parity errors in more than one byte is detected as a multiple error which causes a halt in systems operations. This has the same disadvantage of reducing memory throughput as discussed above. As concerns the system of the IBM Disclosure Bulletin, the occurrence of a bus byte parity error can go undetected in systems subject to soft error conditions.

Accordingly, it is a primary object of the present invention to provide an improved apparatus for deferring the detection and correction errors within the parity encoded data bytes received from any one of a plurality of input/output devices for storage in a memory subsystem.

It is another object of the present invention to provide improved apparatus for use in a memory subsystem susceptible to soft errors which connect to high speed common bus system.

It is still a further object of the present invention to provide an arrangement for detecting and correcting errors in a manner which requires a minimum of additional circuits.

SUMMARY OF THE INVENTION

The above and other objects are achieved in several preferred embodiments of the present invention. A first embodiment includes encoder circuits which couple to the input circuits of a memory system and decoder circuits which couple to the output circuits of the memory system. The decoder circuits connect to error correction circuits which transmit corrected data byte and parity bit signals to the bus. The encoder circuits are connected to receive from the bus data byte signals and parity bit signals by any one of a number of input/output devices. During a write memory cycle of operation, the encoder circuits generate a predetermined number of coded check bits from the unchecked data byte signals and associated plurality of parity bits received from the device. The encoder circuits are operative to force selectively the coded check bits to predetermined states when the parity bits of the unchecked data bytes indicate that one or more data bytes are in error. More particularly, the check bits are forced such that the syndrome bits contain an ODD number of binary ONES (an odd code) when a bus parity error is present in a plurality of bytes or in one byte. Thereafter, the data signals and generated check code bits are written into memory.

During a subsequent read cycle of operation, the decoder circuits are conditioned by the check bits to generate selectively syndrome bits having a predetermined characteristic for signalling that the data bytes were in error when they were initially written into memory. This enables the automatic detection and signalling of multibyte errors within the data bytes written into a memory location. The occurrence of a single bit error in a memory location results in changing the odd syndrome code, introduced by the presence of a bus parity error, into a syndrome bit code having an EVEN number of binary ONES. This, in turn, ensures proper detection of the uncorrectable error condition.

The embodiments of the present invention include separate parity check circuits enabling the use of identical encoder and decoder matrices. The parity check circuits provide for byte parity checking. The results of such checking is stored in a status register indicator. The two embodiments differ in that the second embodiment utilizes a common matrix for performing encoding and decoding operations.

In the preferred embodiments of the present invention, the predetermined characteristic is that the syndrome bits contain an even number of binary ONES indicative of an uncorrectable error condition. This occurs when two internal data bits of a memory word are incorrect or when the bytes of a word received from a device contain a multibyte bus parity error and an internal single bit error develops within the same memory word location.

In all other instances, the decoder circuits generate syndrome bits which have an odd number of binary ONES. When there are no errors, the syndrome bits are all ZEROS. In response to syndrome bits having an odd number of binary ONES indicative of a single bit error condition, the correction circuits correct the condition automatically and produce parity bits from the data bytes and check code bits which are thereafter applied to the bus together with the data bytes. In the case of data bytes containing only a bus parity error, the single bit error condition signal is applied to the error circuits which signals the occurrence of an uncorrectable error condition on the bus. This causes the bus error condition to be passed on to the input/output device requesting the erroneous data. Depending upon the other conditions, the device can cause a halt in system operations only at that time.

From the above, it is seen that the arrangement of the present invention by deferring the reporting of uncorrectable error conditions as late as possible (i.e., to the point when the data is to be actually used) minimizes the interruptions in normal data processing operations. This is particularly advantageous where a number of input/output devices are connected to access a memory system from a common bus. Also, the invention permits the automatic detection of multiple byte bus parity errors even when the memory location in which the bytes are stored develops an internal single bit error. The embodiments of the invention by simplifying the complexity of the encoder/decoder circuits adds to the overall reliability of the memory subsystem.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIGS. 4a through 4e illustrate matrices in accordance with the present invention.

DESCRIPTION OF EMBODIMENT 1

Figure 1:
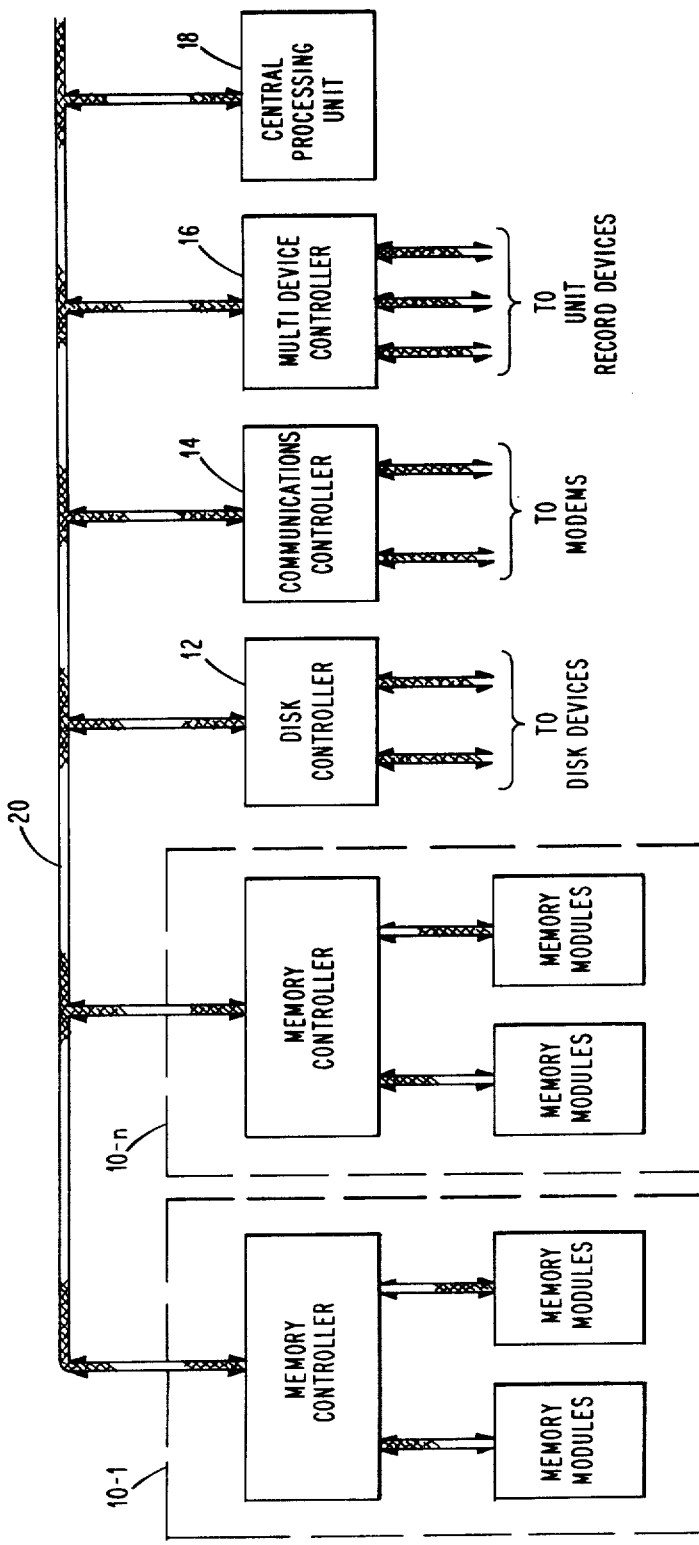
FIG. 1 is a block diagram of a system which incorporates the principles of the present invention.

FIG. 1 illustrates in block diagram form a data processing system which incorporates the teaching of the present invention. It is seen that the system includes a main memory which comprises a plurality of memory subsystems 10-1 through 10-n, a disc controller 12, a communication controller 14, a multidevice controller 16 and a central processing unit 18 all of which connect to a common bus 20.

The bus arrangement enables any two units to communicate with each other at a given time interval over a common signal path provided by bus 20. Briefly, any unit wishing to communicate, requests a bus cycle. When the cycle is granted to the particular requesting unit, it is accorded the role of "master" and can address any other unit in the system as a slave unit. In those instances in which a response is required (i.e., read operations), the requesting unit signals the slave unit that a response (i.e., acknowledge) is required and identifies itself to the slave unit. The master unit applies the information to the bus and the slave unit (i.e., memory) sends an acknowledge signal and initiates a memory cycle of operation. At the time of acknowledgement, the master unit releases itself from the bus.

The bus 20 includes a plurality of address lines, data lines, control lines and integrity lines. Certain ones of these lines will be discussed in greater detail in connection with FIG. 2. However, for detailed information regarding the operation of the system of FIG. 1 and bus 20, reference may be made to U.S. Pat. No. 3,997,896 entitled "Data Processing System Providing Split Bus Cycle Operation", invented by Frank V. Cassarino, et al. and assigned to the same assignee as named herein or the referenced copending patent application of Robert B. Johnson and Chester M. Nibby, Jr.

Figure 2:
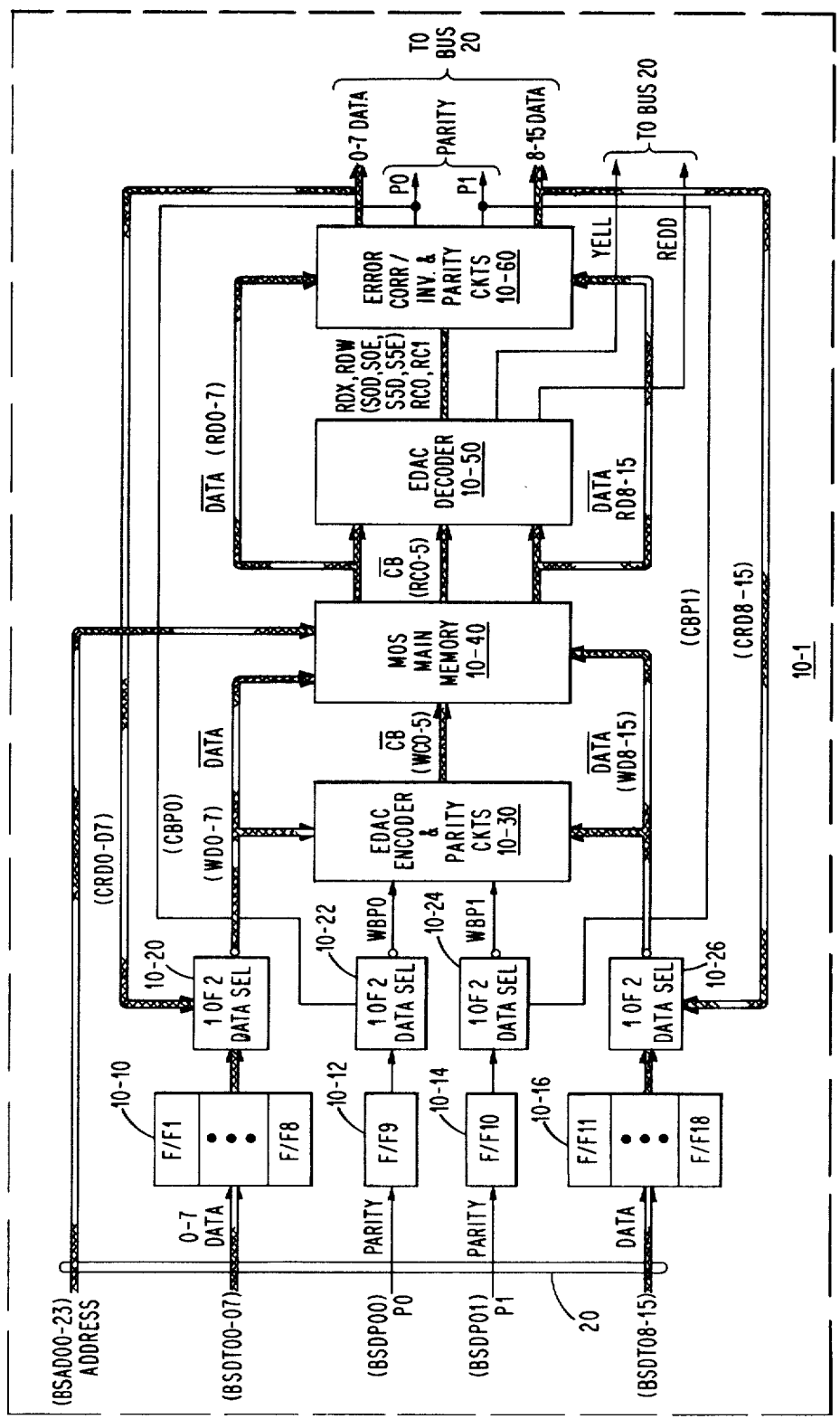
FIG. 2 illustrates in block diagram form one embodiment of one of the memory subsystems of FIG. 1.

Referring now to FIG. 2, it is seen that each memory subsystem in accordance with the present invention includes a MOS memory 10-40 which for the purposes of the present invention can be considered conventional in design. The first embodiment of memory subsystem 10-1 further includes a plurality of circuits 10-20 through 10-26, an EDAC encoder circuit 10-30, an EDAC decoder circuit 10-50, and error correction, inverter and parity circuits 10-60. The plurality of input flip-flops of blocks 10-10 through 10-16 are connected to receive corresponding ones of the signals from bus 20. That is, flip-flops 1 through 8 of block 10-10 receive signals BSDT00-BSDT07 of a first or left hand byte which correspond to data bits 0-7 of the bus 20. Flip-flop 9 of block 10-12 receives a parity signal BSDP00 which contains odd parity for bits 0-7 and A. Flip-flop 10 of block 10-14 receives a parity signal BSDP01 which contains odd parity for data bits 8-15 of a second or right hand byte. The flip-flops 11-18 of block 10-16 receive data bits 8-15.

The signals BSAD00 through BSAD23 are memory address signals which are applied to the input address circuits (not shown) of memory 10-40. Each 24-bit address includes memory module select bits, internal address bits and a byte designator bit and designates a word storage location in memory 10-40.

As seen from FIG. 2, it is seen that the output signals of flip-flops 1-18 are applied as one input of corresponding ones of the plurality of one of two data selector circuits 10-20, 10-22, 10-24 and 10-26. The second input to each of the data selector circuits is from the output of the error correction, inverter and parity circuits of block 10-60.

The output signals WD0-WD7, selected from either flip-flops 1-8 or inverter circuits of block 10-60, are inverted by data selector circuit 10-20 and applied to the EDAC encoder circuit 10-30 and to the write circuits (not shown) of memory 10-40 as shown. In accordance with the present invention, the parity signals WBP0 and WBP1, selected from either flip-flops 9 and 10 or the circuits of block 10-60, are applied as inputs to EDAC encoder 10-30. Further, the byte signals WD8-WD15, from either flip flops 11-18 or circuits 10-60 are applied as inputs to EDAC encoder 10-30 and memory 10-40.

As explained herein, the EDAC encoder 10-30 generates from the inverted byte data signals WD0-WD15, bus and byte parity signal BPE, check code bit signals WC0-WC5. The check code signals together with the byte signals associated therewith are stored in memory 10-40. As seen from FIG. 2, the inverted signals are applied to EDAC decoder 10-50 and the circuits 10-60.

The EDAC decoder 10-50 produces six pairs of complementary syndrome bit signals S00, S0E through S50, S5E, in addition to two error indicator signals YELL and REDD. The signal YELL when in a binary ONE indicates the detection of a single error and that correction of the error was made. The signal REDD indicates the detection of a double bit error, a multibyte bus parity error (i.e., a parity error in more than one byte), or single bus parity error combined with internal single bit error as explained herein.

The EDAC decoder circuit 10-50 applies the pairs of syndrome signals and check bit and data bit signals RC0, RC1, and RDX to the circuits 10-60. As explained herein, the circuits 10-60 provide corrected signals CRD0-CRD15 to bus 20 and to data selector circuits 10-20 and 10-26 as mentioned previously. Also, the circuits 10-60 produce the parity signals CBP0 and CBP1 which are also applied to bus 20 and data selector circuits 10-22 and 10-24.

The data selector circuits discussed above for the purpose of the present invention may be considered conventional in design. The EDAC encoder circuit 10-30, the EDAC decoder circuit 10-50, and the circuits 10-60 are shown in greater detail in FIGS. 3a through 3c respectively.

Figure 3A:
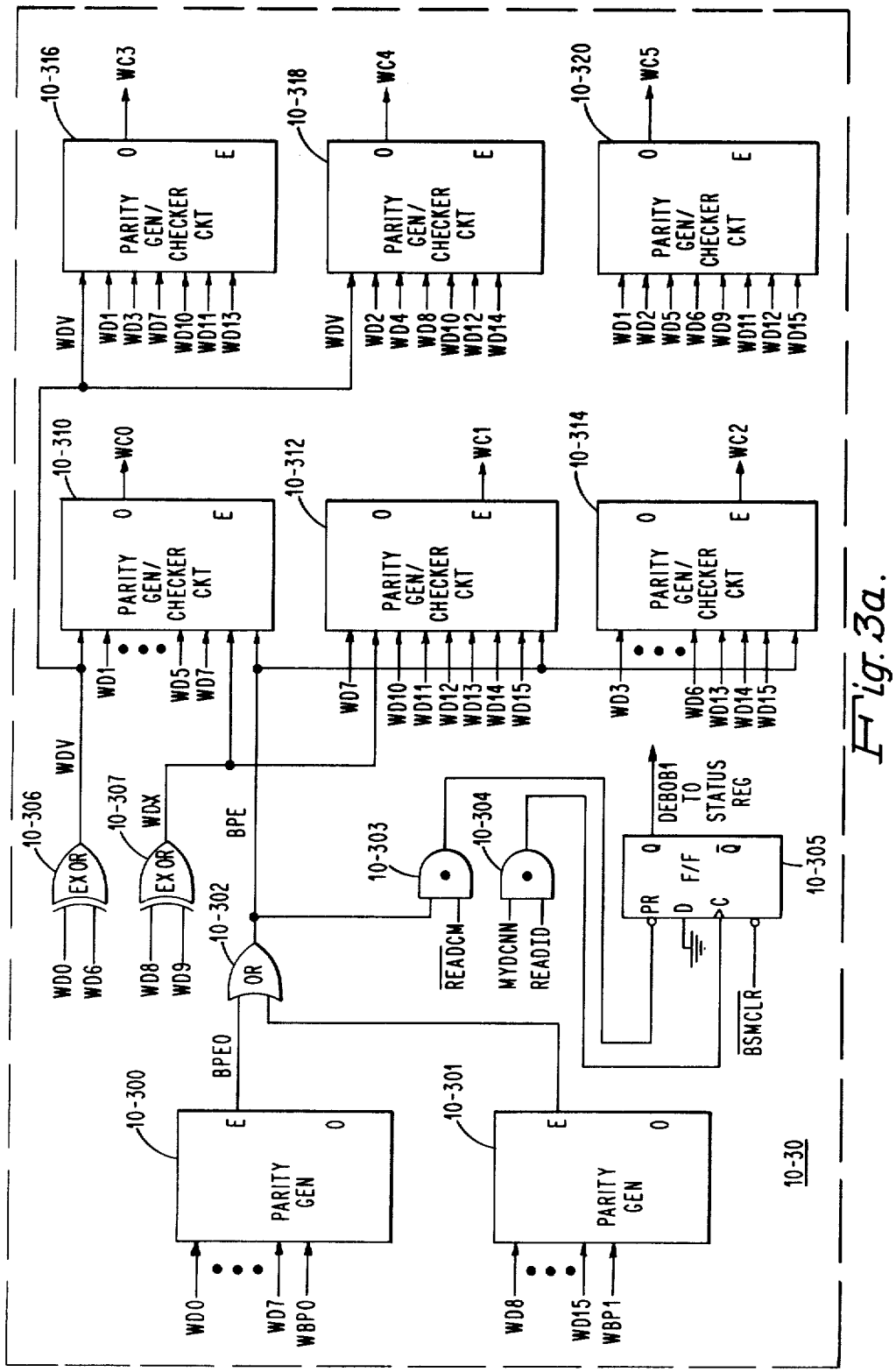
FIGS. 3a through 3c illustrate in greater detail portions of FIG. 2 in accordance with the present invention.

Referring first to FIG. 3a, it is seen that the EDAC encoder circuit 10-30 comprises a plurality of parity generator exclusive OR circuits 10-310 through 10-320 and a pair of exclusive OR circuits 10-306 and 10-307 connected as shown. The six parity generator circuits 10-310 through 10-320 combine different ones of the data signals and bus parity error signal BPE to generate the check code signals WC0-WC5. As seen from FIG. 3a, the signal BPE is generated by the parity generator circuits 10-300 and 10-301 whose resulting signals BPE0 and BPE1 are logically ORed together by an OR circuit 10-302. During each write operation, bus parity error signal BPE is stored in an indicator D-type flip-flop 10-305 in response to read command signal READCM via an AND gate 10-303. The flip-flop 10-305 is later cleared by bus timing signal MYDCNN and READID applied via AND gate 10-304.

Each parity generator/checker circuit which can be considered conventional in design. For example, such circuits may be constructed utilizing a 9-bit parity generator/checker circuit designated 82S62 manufactured by Signetics Corporation. The even output terminal designated E or the odd output terminal designated O are applied as inputs to memory 10-40 as indicated.

The combinations of signals to be summed are selected in accordance with the matrix of FIG. 4a. The matrix illustrates the generation of each of the check code bit signals WC0 through WC5. It will be noted that the matrix includes columns representing states of the data bits 0-7 and 8-15.

Normally, the inputs to each of the parity generator circuits are binary ZEROS which corresponds to ZERO volts. When the inputs are switched on or forced to a binary ONE, they assume a positive voltage value.

It will be noted that the matrix of FIG. 4a is the same as the matrix of FIG. 4b. The matrix of FIG. 4b represents a modified version of the so-called H matrix for generating the check code bits for the two byte, 16-bit, data word in accordance with the present invention. The basic matrix is expanded to include BPE column for designating a bus parity error.

In accordance with the present invention, it will be noted that the occurrence of a bus parity error in more than one data byte, as well as one byte, results in causing the decoder circuit 10-50 to generate syndrome bits having an odd number of binary ONES as explained herein. This results from including an odd number of binary ONES in the BPE. This unique single error code when decoded as explained herein can be used to signal the occurrence of a bus parity error condition. This provides the desired bus parity error detection capability. The column BPE denotes the summation of all of the byte parity error signals for all of the bytes. More specifically, $BPE = BPE0 + BPE1 + \ldots BPEn$ where byte 0 parity error signal BPE0=0⊖1-7⊖BP0, byte 1 parity error signal BPE1=8⊖9-15⊖BP1, etc.

Figure 3B:
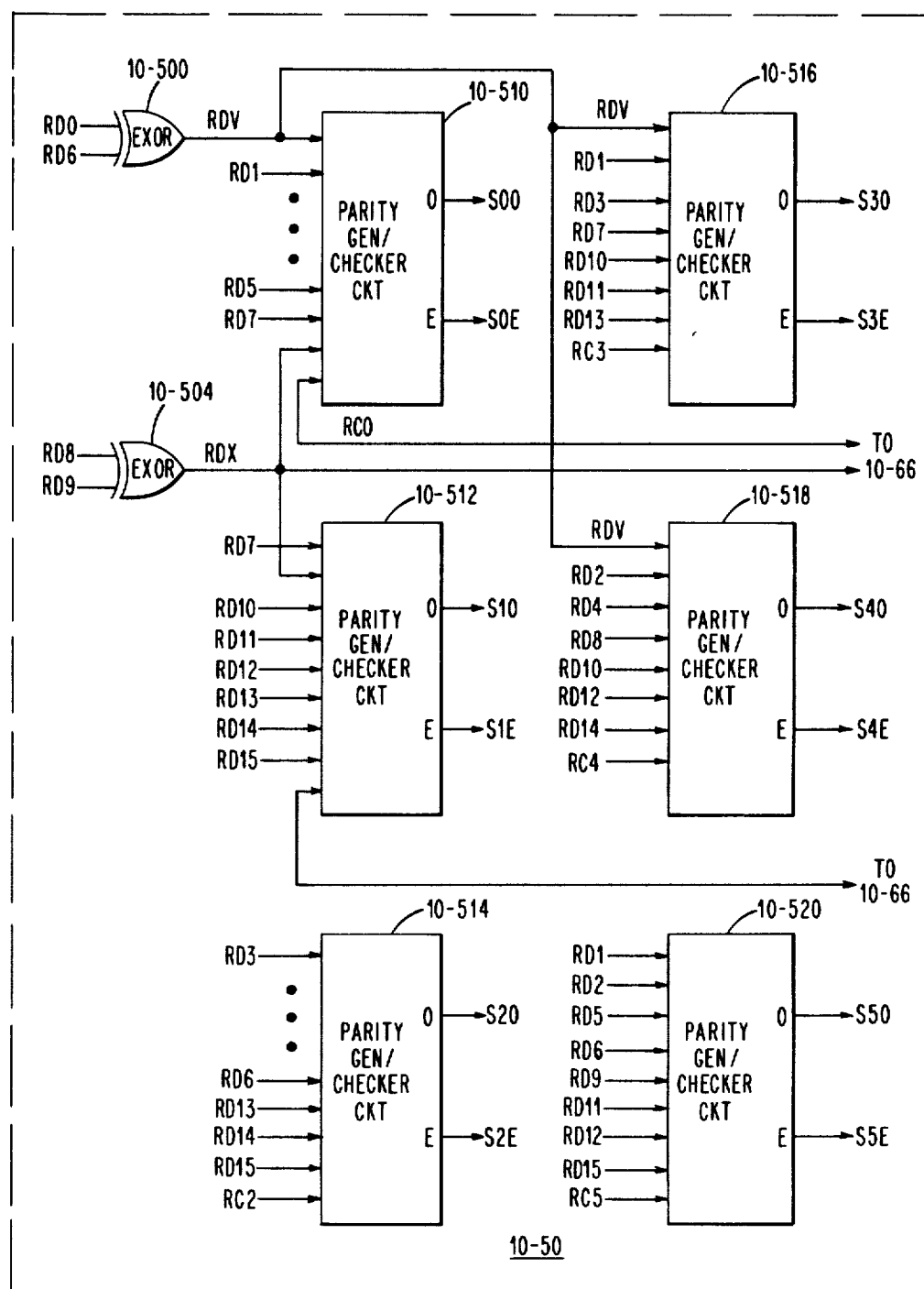

The decoder circuit 10-50 is shown in detail in FIG. 3b. The circuit 10-50 is constructed in accordance with the parity check matrix of FIG. 4c which is identical to the encoder matrix of FIG. 4b. It should be noted that the decoder matrix does not include a BPE column. The reason is that the error designated by this column has been incorporated into the generation of check bits by encoder circuit 10-30 such that an error condition corresponds to a binary ONE and a no error condition corresponds to a binary ZERO. Therefore, decoder 10-50 requires a ZERO input for a no bus parity error condition. In order to detect the presence of a bus parity error condition, decoder 10-50 still requires a ZERO input representative of the BPE signal. Therefore, the BPE signal input can be eliminated from decoder 10-50.

Referring to FIG. 3b, it is seen that the decoder circuit 10-50 includes a plurality of exclusive OR circuits 10-500 through 10-520 arranged as shown, similar to encoder circuit 10-30. The summing of the different binary ONE columns of the matrix of FIG. 4c required for the generation of syndrome bits S0 through S5 is also accomplished by means of parity generator/checker circuits. As indicated by FIG. 4c, S0 through S5 require summation of column signals as shown (i.e., S0 requires 11, S1 requires 10, etc.). Certain data bits (i.e., RD0, RD6 and RD8, RD9) are summed by exclusive OR circuits 10-500 and 10-504.

Syndrome bits S0 and S3-S5 are generated using odd parity output terminals and syndrome bits S1 and S2 are generated using even parity output terminals. These outputs were chosen such that selected data patterns would give an all ONES check bit field for diagnostic purposes. For example, as seen in FIG. 4d, the stored pattern $\overline{A}$=7FFE generates a check bit field of all ONES.

Figure 3C:
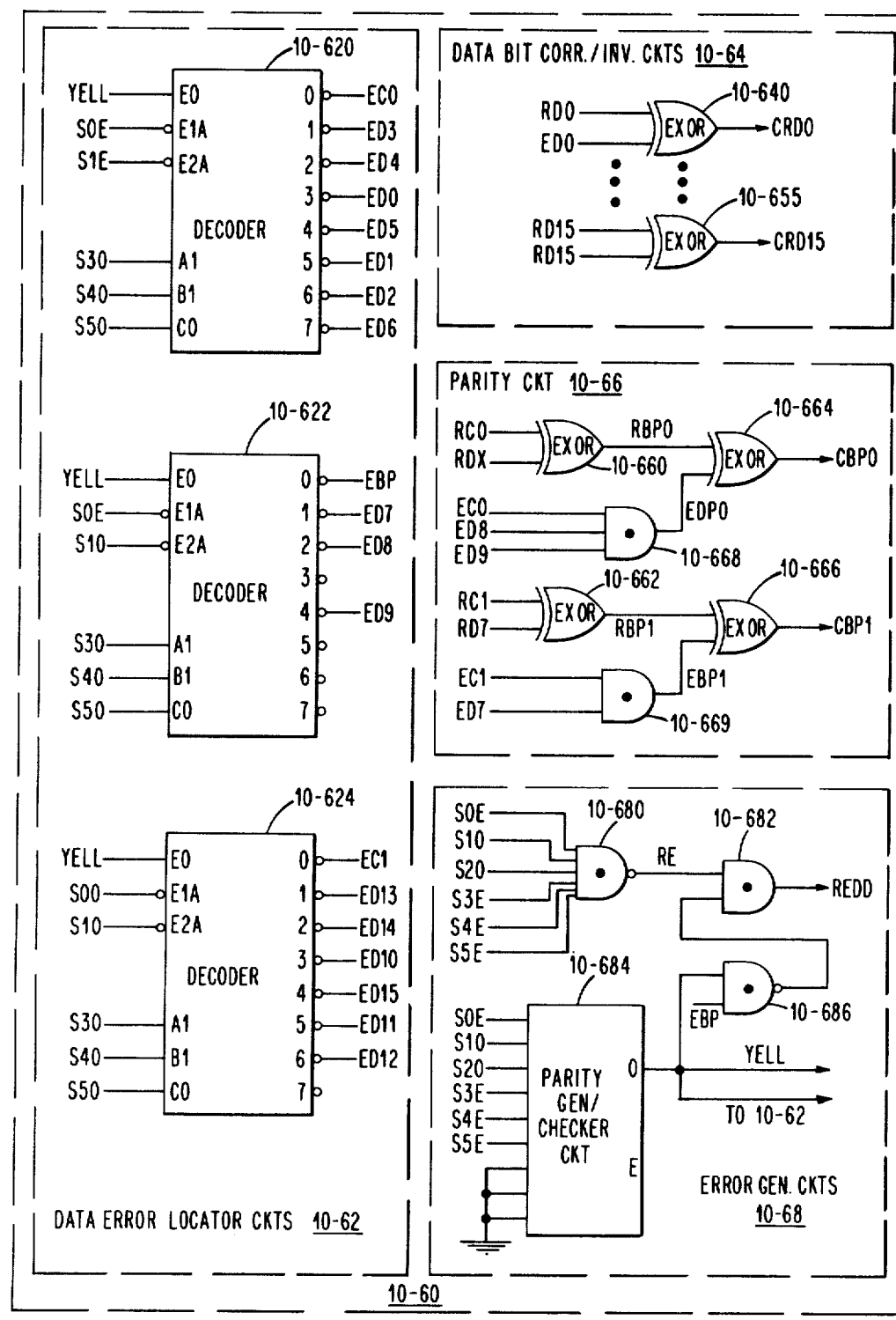

FIG. 3c illustrates the circuits of block 10-60 which locate and correct single bit errors in addition to producing byte parity signals and error signals. As seen from the Figure, the block 10-60 includes a minimum number of error location circuits 10-62, a plurality of correction circuits 10-64, a parity circuit 10-66 and a plurality of error generation circuits 10-68 arranged as shown.

The circuits 10-62 designate the particular bit which requires correction in the case of a single bit error. The circuits 10-62 include a plurality of decoder circuits 10-620 through 10-624 each of which receive different combinations of syndrome bit signals. The decoder circuits may be considered conventional in design. For example, they may employ circuits such as an SN74S138 manufactured by Texas Instruments, Inc.

As seen from FIG. 3c, each decoder circuit has three enable input terminals and three binary select input terminals. The syndrome signals applied to the enable input terminals in the case of an error select one of the three decoder circuits while the syndrome signals applied to the select input terminals select the particular bit to be corrected. For example, where signal YELL is a binary ONE indicative of a correctable error condition and syndrome bits S0, S1 and S3-S5 have a value 11 (010) results in the selection of decoder circuit 10-624 and in the forcing of signal ED14 from a binary ONE to a binary ZERO (i.e., from a positive voltage level to a zero voltage level).

A different one of the output signals EC0 through ED12 from the circuits 10-62 is applied as one input of a particular one of the plurality of exclusive OR circuits 10-640 through 10-655 of the data bit correction circuits 10-64. Each exclusive OR circuit both corrects and inverts the state of the data bit signal applied as a second input thereto. More specifically, normally the signals applied to each exclusive OR circuit is a binary ONE causing the output terminal of each circuit to act as an inverter. When no correction is designated, the decoder signal (e.g., signal ED4) remains a binary ONE. Therefore, the signal present at the output terminal of the exclusive OR circuit is the complement or inverse of input data signal (e.g., signal CRD4=RD4). When correction is required, the decoder signal is forced to a binary ZERO state. Therefore, the signal present at the output terminal of the exclusive OR circuit is the same as the input data signal (e.g., signal CRD4=RD4).

As seen from FIG. 3c, the parity circuit 10-66 includes exclusive OR circuits 10-660 through 10-666 and a pair of AND gates 10-668 and 10-669 arranged as shown. Parity bit CBP0 represents odd parity for bits 0-7 while parity bit CBP1 represents odd parity for bits 8-15.

In FIG. 3c, if RC0 is a binary ONE and data bit signals RD8 and RD9 are equal, RDX is a binary ZERO, then signal RBP0 is a binary ONE. Signal RBP0 assumes the same state as signal RC0. When signals RD8 and RD9 are unequal, RDX is a binary ONE. Signal RBP0 is the complement of the state of signal RC0.

In the case of no correction, signal EBP0 is normally a binary ONE which means that signals EC0, ED8 and ED9 are normally binary ONES. Therefore, signal CBP0 corresponds to the complement of signal RBP0. In the case of a correction when signal EBP0 is forced to a binary ZERO, signal CBP0 assumes the same state as signal RBP0. The circuits 10-662 through 10-666 and circuit 10-669 operate in a similar fashion to produce signal CBP1.

The last group of circuits in FIG. 3c generates error signals REDD and YELL. The circuits include a pair of NAND gates 10-680 and 10-686, an AND gate 10-682 and an exclusive OR circuit 10-684 arranged as shown. The signal YELL signals the system of FIG. 1 when the memory subsystem 10-1 detected a single bit error in a data word which it corrected. The signal REDD signals the system when the memory subsystem 10-1 detected an uncorrectable error which includes a double bit error or a multibyte bus parity error.

When there is no error, syndrome signals S0E through S5E are normally all binary ONES. This causes signal RE to be a binary ZERO which causes signal REDD to be a binary ZERO. The circuit 10-684 in this case forces its odd output terminal to a binary ZERO and its even output terminal to a binary ONE.

In the case of a correctable error where there is an odd number of syndrome bits, circuit 10-684 forces its odd terminal to a binary ONE and its even terminal to a binary ZERO. Hence, signal REDD remains a binary ZERO. Thus, the state of signal RE does not matter in this case.

When there is uncorrectable error where there is an even number of syndrome bits, an even number of the syndrome signals S0E-S5E are binary ZEROS. This forces signal RE to a binary ONE. The circuit 10-684 forces its even output terminal to a binary ONE and its odd output terminal to a binary ZERO. This causes AND gate 10-682 to force signal REDD to a binary ONE. Also, in accordance with the present invention, when there is a single parity error, decoder circuit 10-622 is forced to a binary ZERO. This causes NAND gate 10-686 to force its output to a binary ONE which results in AND gate 10-682 forcing signal REDD to a binary ONE.

DESCRIPTION OF EMBODIMENT 2

The second embodiment of the present invention shown in FIGS. 5a through 5d is utilized in a paired memory module double wide memory bus system such as that disclosed in the referenced patent applications of Robert B. Johnson and Chester M. Nibby, Jr. Those circuits which perform operations similar to those described above have been numbered in a similar fashion to the extent possible. It will be noted that the circuits associated with only one memory module (even module) is shown since the circuits for the odd module are the same.

Figure 5A:
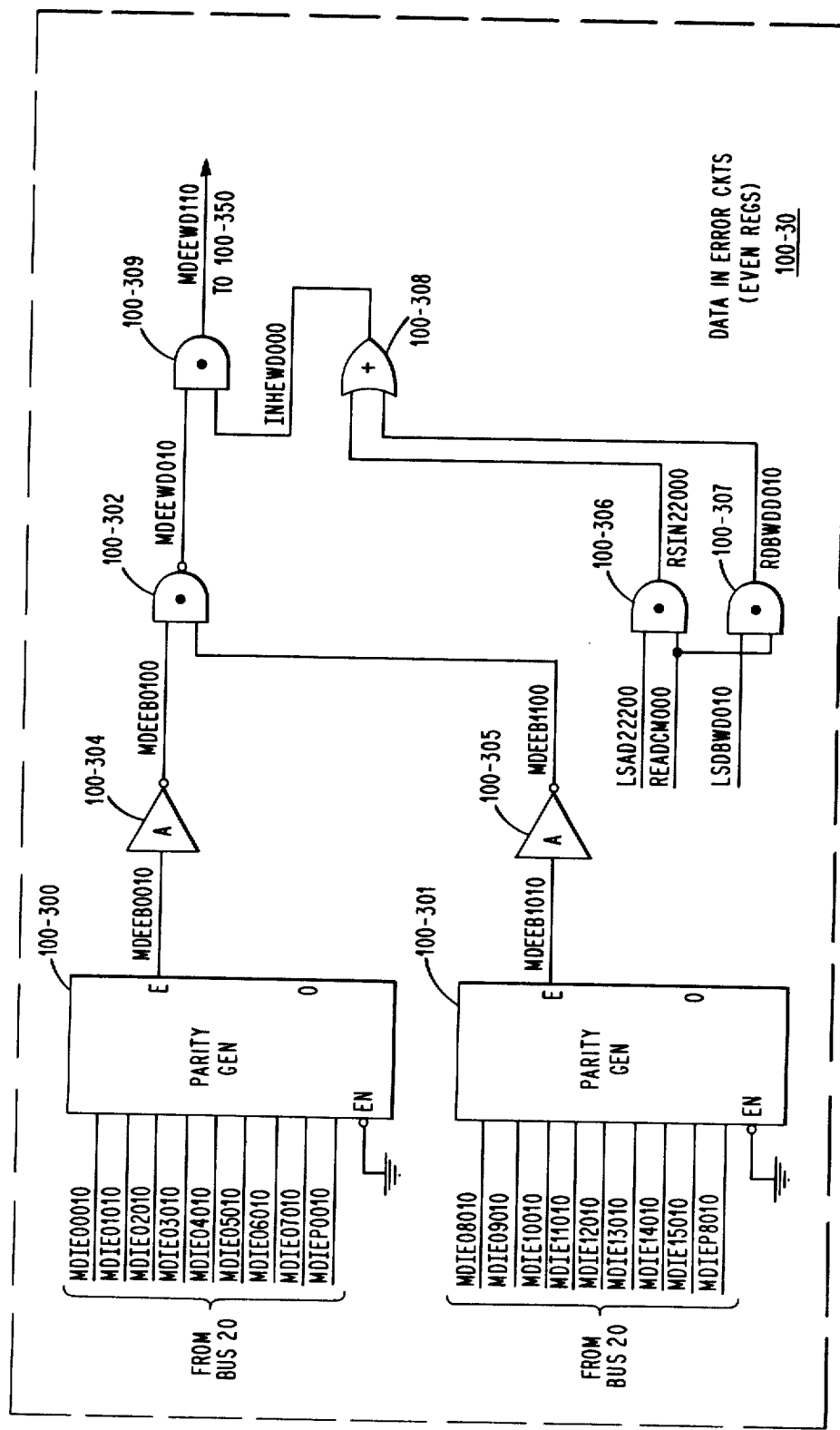
FIGS. 5a through 5d illustrate a second embodiment of one of the memory subsystems of FIG. 1.
Figure 5B:
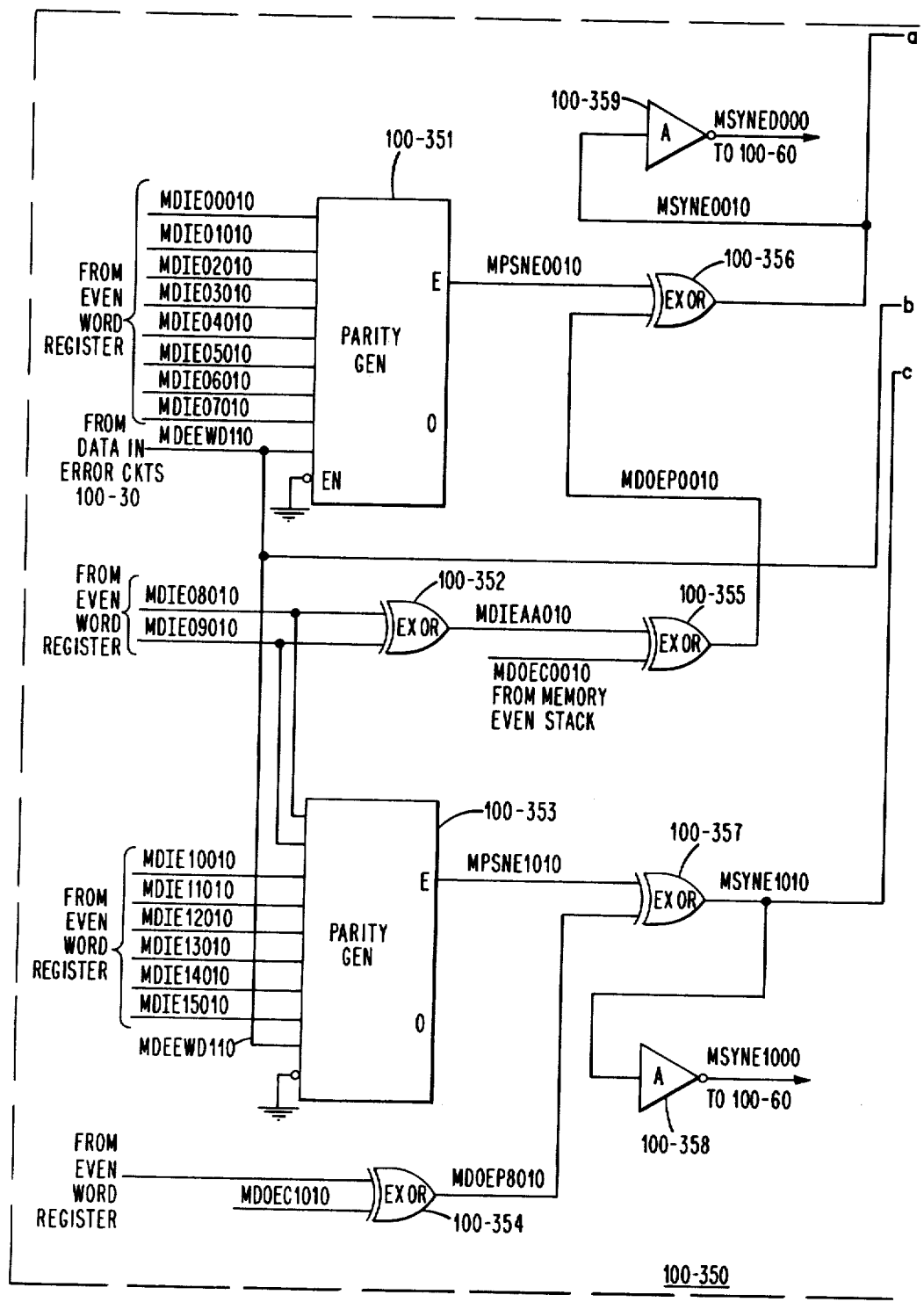
Figure 5B:
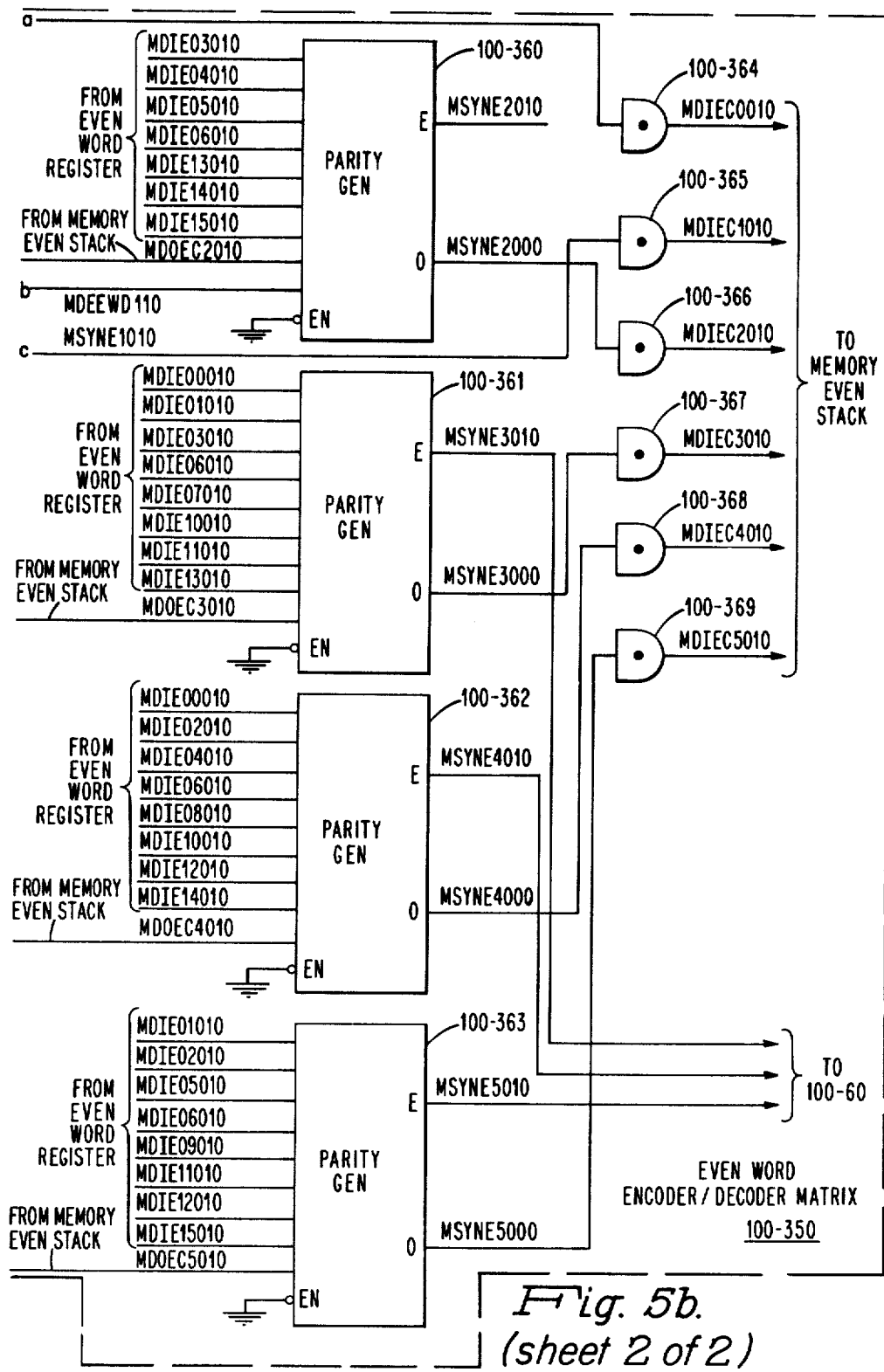
Figure 5C:
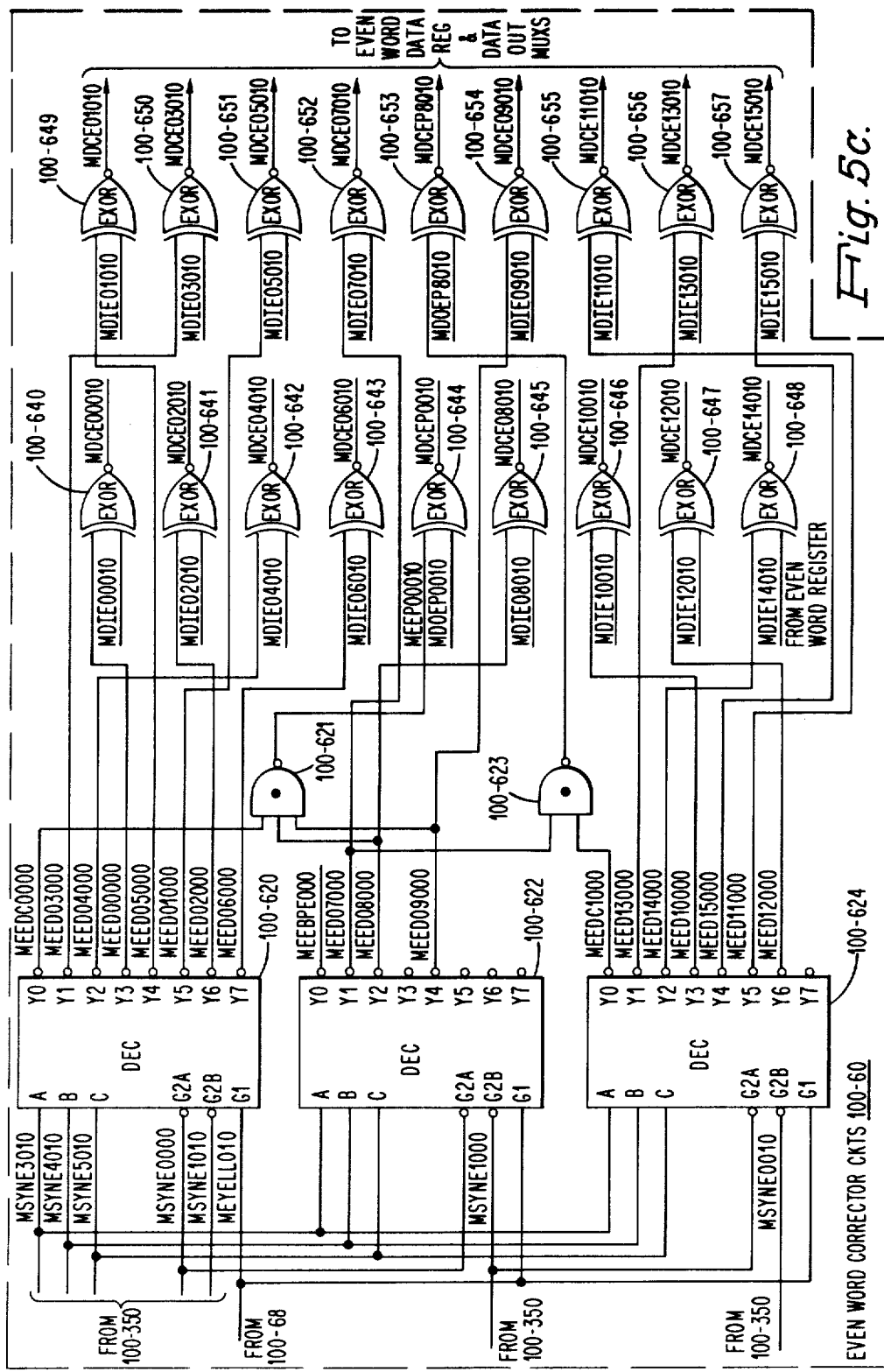
Figure 5D:
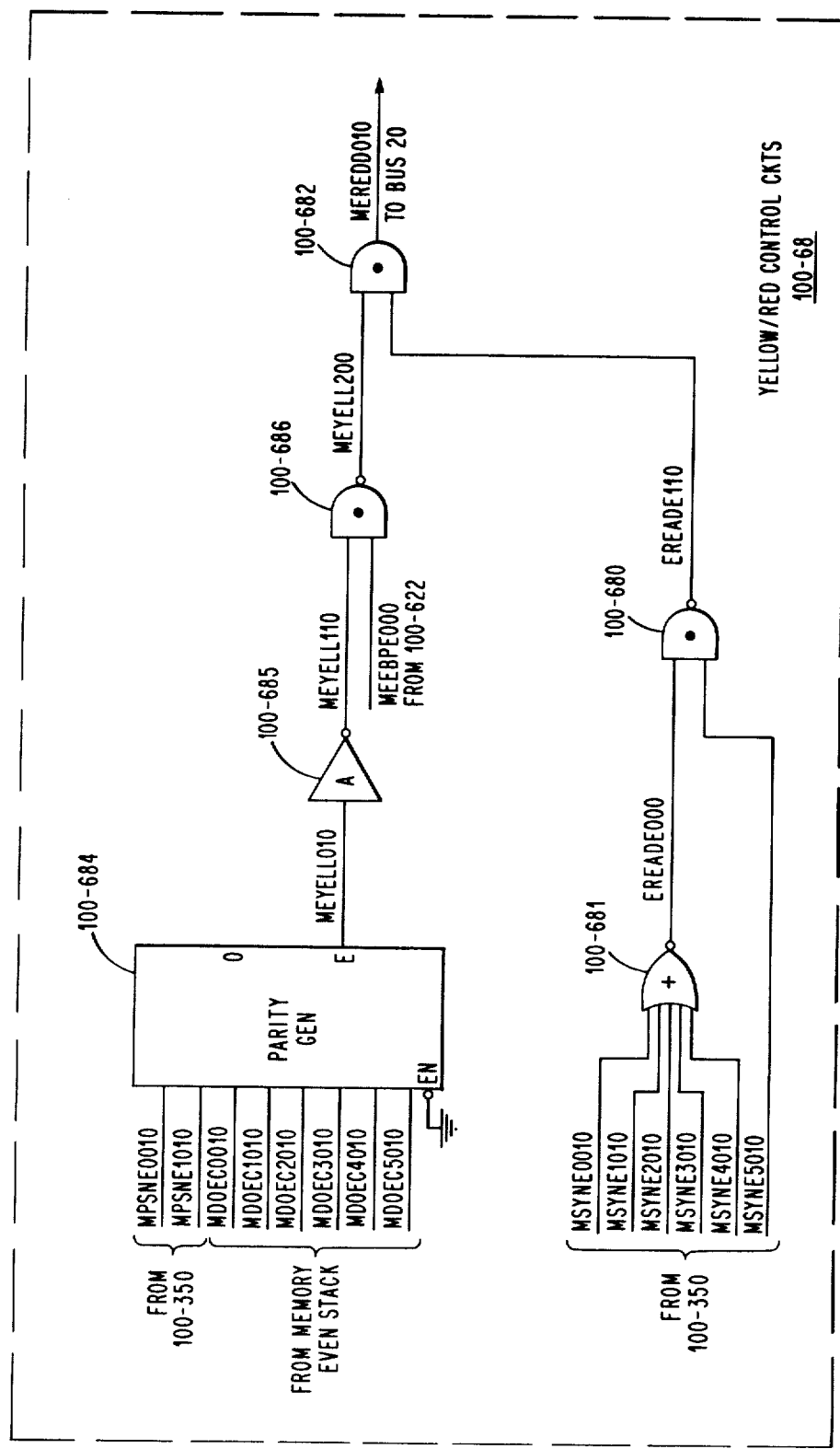

As seen from the Figures, the major difference in the two embodiments resides in the implementation of the matrices. In this embodiment, a single matrix including the circuits 100-351 through 100-369 of FIG. 5b are used as both an encoder and a decoder. The matrices are constructed in accordance with FIGS. 4b and 4c. FIG. 5a illustrates the circuits 100-300 through 100-309 which generate the multibyte bus parity error signal MDEEWD110. FIG. 5c shows the data error locator decoder circuits and exclusive OR correction circuits 100-620 through 100-657 which decode the syndrome bits and correct single bit data errors in addition to generating byte parity signals. Further, FIG. 5d shows the error generator circuits 100-680 through 100-685 which generate the red error indication signal ME-REDD010.

Each of the circuits of FIGS. 5a through 5d are constructed from circuits which are for the most part the same as those utilized in the first embodiment. However, it will be noted that the corrector circuits of FIG. 5c include a number of inverting exclusive OR circuits such as SN74S135 circuits manufactured by Texas Instruments Inc.

DESCRIPTION OF OPERATION

An example illustrating the operation of memory subsystem 10-1 in accordance with the present invention will now be discussed with reference to FIGS. 4d and 4e. It is assumed that one of the devices of FIG. 1 applies words $\overline{A}$, $\overline{B}$, and $\overline{C}$ in succession to memory subsystem 10-1 for writing into three successive memory locations during three successive bus cycles. In the first case, the word $\overline{A}$ is shown with no errors, while words $\overline{B}$ and $\overline{C}$ are applied with bad bus parity.

In accordance with the matrix of FIG. 4a, the encoder circuit 10-30 of FIG. 3a generates values for coded check bits C0 through C5 by summing the data and parity bits in each word as designated by the binary ONE bits in the matrix of FIG. 4a. The values of the coded check bits produced by encoder circuit 10-30 are as indicated.

The data and coded check bits of each word are written into memory subsystem 10-1 during a memory cycle of operation. It will be appreciated that from the point of view of memory subsystem operation, there is no recognition of any error present in the stored data until it is read out during a read cycle of operation.

It is assumed that a device requests read out of the same three data words. When they are applied to decoder 10-50, this results in the generation of syndrome bit signal S0 through S5 which are all binary ZEROS for word $\overline{A}$ indicating the presence of no errors (see FIG. 4e).

Referring to FIG. 3c, it will be noted that when the syndrome bits are all ZEROS, signals S00 and S30 through S50 are binary ZEROS while signals S1E and S2E are binary ONES. This causes the output signals EC0 through EDB to remain binary ONES which simply results in the complementing of each of the signals RD0 through RDB by the exclusive OR circuits of block 10-64. The signals S0E through S5E condition the error generation circuits 10-68 which cause signals REDD and YELL to be binary ZEROS (i.e., signal RE is forced to a binary ZERO while the E terminal of circuit 10-684 is forced to a binary ONE).

It can be seen from the above how the arrangement of the present invention generates the appropriate coded check and syndrome signals for coded words containing no errors.

Now, it will be assumed that the parity bits of more than one of the bytes of words $\overline{B}$ and $\overline{C}$ when presented to memory subsystem 10-1 by a device were in error and therefore contained bad parity. Accordingly, this results in a binary ONE being included in column BPE of FIG. 4d. As seen from FIG. 4d, this causes check code bits C0 through C2 to be binary ZEROS while check code bits C3–C5 remain binary ONES.

In the case of word $\overline{B}$, when a device requests the read out of word $\overline{B}$ during a subsequent read memory cycle of operation, this results in decoder circuit 12-50 forcing syndrome bits S0 through S2 to binary ONES. Syndrome bits S3–S5 remain binary ZEROS. This causes decoder circuits 10-510, 10-512 and 10-514 of FIG. 3b to force signals S00, S1E and S2E to binary ONES. The signals S30 through S50 remain binary ZEROS. Accordingly, the odd number of ONES in the syndrome bits causes circuit 10-684 of FIG. 3c to force its odd output terminal (i.e., signal YELL) to a binary ONE which results in no change in the output of NAND gate 10-686. Also, circuit 10-622 forces signal EBP to a binary ZERO indicating that a bus parity error had been stored in word $\overline{B}$. Signal EBP causes NAND gate 10-686 to switch its output to a binary ONE. Circuit 10-680 in response to the syndrome bits force signal RE to a binary ONE. Signal RE and the binary ONE output of NAND gate 10-686 cause AND gate 10-682 to force signal REDD to a binary ONE. This signals an uncorrectable error condition to the system.

In the case of word $\overline{C}$, it will be appreciated that when an internal single bit error condition occurs such as in word $\overline{C}$, this causes the syndrome bits to be changed from an odd number of binary ONES to an even number of binary ONES. For example, it is assumed that word $\overline{C}$ is written correctly into memory but when read out, it contains an error in bit 0, in addition to the bus parity error.

The decoder circuit 10-50 forces syndrome bits S1 through S4 to binary ONES for this condition. That is, signal S00 and S50 are forced to a binary ZERO, while signals S1E through S4O are forced to a binary ONE.

The parity error generation circuits 10-684 are now conditioned by the even number of binary ONES to force its odd output terminal to a binary ZERO. This causes NAND gate 10-686 to force its output to a binary ONE. Since signal RE is also a binary ONE, AND gate 10-682 forces signal REDD to a binary ONE signalling the uncorrectable error condition to the system of FIG. 1.

It will be appreciated that a double error in a word also causes the circuits 10-68 to force signal REDD to a binary ONE indicating an uncorrectable error condition. For example, it is assumed that bits 0 and 1 of word A are both binary ZEROS when read out during a read cycle of operation. This causes the decoder circuit 10-50 to force syndrome bits S4 and S5 to binary ONES. This, in turn, causes the circuit 10-684 to force its even output terminal to a binary ONE which results in signal REDD being forced to a binary ONE.

The second embodiment operates in a similar fashion to detect multiple bus byte parity errors. However, there is no inversion of the bytes written into memory. Briefly, syndrome bits S2–S5 are generated by circuits 100-360 through 100-363. Syndromes bits S0 and S1 are generated by circuits 100-356 through 100-359. The check bits C0–C5 are generated by the plurality of buffer circuits 100-364 through 100-369 in response to the indicated syndrome signals S0–S5. The error circuits of FIG. 5d generate the appropriate red and yellow error signals to the bus in the manner similar to that described above. In order to minimize the time required in generating such signals, the check bits are utilized in place of the syndrome signals. That is, it can be shown that the YELL signal can also be generated by exclusively ORing all of the data bits (MPSNE0 and MPSNE1) and check bits (MDOEC0-5).

From the foregoing, it is seen how the arrangement of the present invention is able to detect and signal the presence of a variety of uncorrectable error conditions to a system while enabling the system to operate at maximum speed and efficiency. Moreover, the present invention provides the foregoing without having to increase the number of coded check bits required to be stored. Also, the arrangement of the present invention minimizes the amount of error detection and correction circuits thereby resulting in increased system reliability.

It will be appreciated by those skilled in the art that many changes may be made to the preferred embodiment of the present invention. For example, this could include changes in the number of bits included in a word, the type of bus system and type of circuits.

While in accordance with the provisions and statutes there has been illustrated and described the best form of the invention known, certain changes may be made to the system described without departing from the spirit of the invention as set forth in the appended claims and, in some cases, certain features of the invention may be used to advantage without a corresponding use of other features.

What is claimed is:

1. A data processing system including a plurality of data handling devices, each connected in common to receive and transfer words including a plurality of bytes over a bus network, said system further including a memory subsystem comprising:

a memory for storing said words;

input means coupled to said bus for receiving one of said words from any one of said data handling devices for storage in said memory during a memory cycle of operation, each said word including a plurality of bytes and a plurality of parity bit signals each or indicating the validity of a different one of said bytes;

encoder means coupled to said input means and to said memory, said encoder means for generating a group of coded check bits derived from said plurality of said bytes and said plurality of parity bit signals, said encoder means forcing a predetermined number of said coded check bits to predetermined states when said plurality of parity bit signals indicate that said bytes are in error;

means connected to said encoder means and to said input means for applying said bytes and group of coded check bits to said memory for said storage during said memory cycle of operation; and, decoder means coupled to said memory, said decoder means for generating a plurality of syndrome signals for locating an error in said bytes, the location of said error being established by said bytes and said coded check bits read out from said memory during a subsequent cycle of operation, said plurality of syndrome signals having a first predetermined characteristic for signalling when said plurality of bytes of a word received from any one of said data handling devices have incorrect parity when written into said memory enabling the detection of multibyte parity errors in said words to be deferred until accessed by one of said devices so as to have a minimum effect on system performance.

2. The system of claim 1 wherein each said parity bit signals being coded to specify odd parity for a different one of said plurality of bytes.

3. The system of claim 1 wherein said subsystem further includes logic means for correcting an error in said bytes, said logic means being connected to said memory for receiving said bytes of said word read out from said memory and said plurality of syndrome signals for correcting said error in accordance with the states of said plurality of said syndrome signals.

4. The system of claim 1 wherein said first predetermined characteristic corresponds to said plurality of syndrome signals containing an odd number of binary ONES indicative of a single bit error representative of a multibyte parity error.

5. The system of claim 4 wherein said subsystem further includes:

error indicator means connected to said decoder means for receiving selected states of said plurality of syndrome signals and a signal indicative of a bus parity error, said indicator means being operative in response to said plurality of syndrome signals to generate a read error signal and logically combine said read error signal with said bus parity error signal to generate a first output signal indicating the presence of said multibyte parity error to said one device and said indicator means being operative when said plurality of syndrome signals contains an odd number of binary ONES to generate a second output signal indicating the presence of a single bit error condition.

6. The system of claim 5 wherein said decoder means includes a plurality of parity circuits corresponding in number to the number of said plurality of syndrome signals, each of said plurality of parity circuits being connected to receive a different combination of said data bit signals and check bits, each said parity circuit including a pair of output terminals for indicating complementary states of a predetermined one of said plurality of syndrome signals and said error indicator means being selectively connected to one of said pair of output terminals of each of said parity circuits for receiving signals corresponding to the normal states of said plurality of syndrome signals.

7. The system of claim 6 wherein said number of said parity circuits is six and said pairs of terminals are designated S00, S0E through S50, S5E corresponding to said syndrome signals and wherein said error indicator means include:

- logic gating means for generating said read error signal, said logic gating means having a plurality of input terminals and an output terminal, said plurality of input terminals being connected to receive signals S10, S20, S0E through S5E;
- parity generator circuit means having a plurality of input terminals and an even and odd output terminal, said plurality of input terminals being connected to receive said signals S10, S20, S0E, S3E through S5E; and,
- output gating means connected to said output terminal of said logic gating means, to said odd output terminal and to receive said bus parity error signal EBP, said output gating means being conditioned by said logic gating means in response to an error condition to generate said first output signal in response to said signal EBP and said error indicator circuit means generating said second output signal when said parity circuit means forces said odd output terminal to a binary ONE indicating that said syndrome signals contain an odd number of binary ONES.

8. The subsystem of claim 5 wherein said decoder means includes a plurality of decoder circuits whose number is less than the number of said plurality of syndrome signals, each of said plurality of decoder circuits being connected to receive a different combination of predetermined ones of said syndrome signals and said second output signal from said error indicator means and each said decoder circuit having a plurality of output terminals for indicating the presence of said bus parity error and which bits of said bytes are to be corrected.

9. The subsystem of claim 8 wherein said number of said plurality of decoder circuits is three, said each decoder circuit having a plurality of enable input terminals and select input terminals, said enable input terminals being connected to receive said second output signal and a predetermined combination of a first pair of said syndrome signals and said select input terminals being connected to receive a second group of said syndrome signals.

10. The subsystem of claim 9 wherein said first pair of said syndrome signals correspond to signals S0E, S00 and S1E, S10 and said second pair of said syndrome signals correspond to signals S30 through S50.

11. The system of claim 1 wherein said encoder means includes:

- a plurality of parity circuits corresponding in number to the number of check bits in said word, each of said plurality of parity circuits being connected to receive a different combination of said data bytes and predetermined ones of said parity circuits being connected to receive a bus multibyte parity error signal for indicating the presence of a parity error signal in more than one byte, each said parity circuit including a pair of output terminals for indicating complementary states of a predetermined one of said plurality of coded check bits and wherein said means include circuit means connected to a predetermined one of said pair of output terminals of each said parity circuit for applying a predetermined state of each of said coded check bits to said memory.

12. The system of claim 11 wherein said encoder means further includes:

- a plurality of parity generator circuits corresponding in number to said plurality of bytes in said word, each parity generator circuit being connected to receive the data and parity bits of a different one of said bytes and operative to generate a byte parity error signal for indicating the presence of an error in said byte; and,
- logic gating means coupled to receive said byte parity error signal from said each parity generator circuit, said logic gating means being operative to logically combine said byte parity error signals so as to generate said multibyte signal for indicating a parity error in more than one of said bytes.

13. The system of claim 12 wherein said logic gating means includes an OR gate circuit.

14. The system of claim 12 wherein groups of check bits include an even number of bits and wherein said predetermined number of said coded check bits forced to said predetermined states is an odd number.

15. The system of claim 14 wherein said even number of bits is six and said odd number of check bits is three.

16. A data processing system including at least one memory unit, a central processing unit and a plurality of peripheral devices each being connected to a bus for transmitting and receiving words to and from said memory unit each of said words including a number of bytes and a corresponding number of parity bits for indicating the validity of one of said bytes associated therewith, said memory unit comprising:

- an addressable memory having a plurality of word locations;
- input means connected to said bus for receiving any one of said words from any one of said devices and said central processing unit for storage in one of said word locations during a memory cycle of operation;
- an encoder connected to said input means, said encoder being operative to generate a group of check bits from said each of said words received from said bus, and a plurality of parity byte error signals, said encoder forcing a number of check bits to a predetermined state upon detecting a bus parity error signalling that more than one of said plurality of bytes are in error;
- means connected to said encoder and to said input means for applying said number of bytes of said each word and said group of check bits to said memory for writing into one of said memory locations during said memory cycle of operation; and,
- a decoder connected to said memory, said decoder generating a plurality of syndrome signals for locating errors in said number of bytes of said one of said memory location when read out during a subsequent memory cycle of operation, said decoder being conditioned by said number of said check bits being in said predetermined state to cause said plurality of syndrome signals to have a first predetermined characteristic for signalling when said plurality of bytes of said each word had bad parity when written into said memory enabling the detection of multibyte parity errors in said words to be deferred until read out by one of said devices to proceed without decreasing the operation speed of said system.

17. The system of claim 16 wherein said first predetermined characteristic corresponds to said plurality of syndrome signals containing an odd number of binary ONES indicative of said bus parity error.

18. The system of claim 17 wherein said decoder produces said even number of binary ONES by forcing an odd number of syndrome signals to binary ONES.

19. The system of claim 16 wherein said subsystem further includes logic means for correcting an error in said bytes, said logic means being connected to said memory for receiving said bytes of said word read out from said memory and said plurality of syndrome signals for correcting said error in accordance with the states of said plurality of said syndrome signals.

20. The system of claim 19 wherein said subsystem further includes:
error indicator means connected to said decoder means for receiving selected states of said plurality of syndrome signals and a signal indicative of a bus parity error, said indicator means being operative in response to said plurality of syndrome signals to generate a read error signal and logically combine said read error signal with said bus parity error signal to generate a first output signal indicating the presence of said multibyte parity error to said one device and said indicator means being operative when said plurality of syndrome signals contains an odd number of binary ONES to generate a second output signal indicating the presence of a single bit error condition.

21. The system of claim 20 wherein said decoder means includes a plurality of parity circuits corresponding in number to the number of said plurality of syndrome signals, each of said plurality of parity circuits being connected to receive a different combination of said data bit signals and check bits, each said parity circuit including a pair of output terminals for indicating complementary states of a predetermined one of said plurality of syndrome signals and said error indicator means being selectively connected to one of said pair of output terminals of each of said parity circuits for receiving signals corresponding to the normal states of said plurality of syndrome signals.

22. The system of claim 21 wherein said number of said parity circuits is six and said pairs of terminals are designated S00, S0E through S50, S5E corresponding to said syndrome signals and wherein said error indicator means include:
logic gating means for generating said read error signal, said logic gating means having a plurality of input terminals and an output terminal, said plurality of input terminals being connected to receive signals S10, S20, S0E, S3E through S5E;
parity generator circuit means having a plurality of input terminals and an even and odd output terminal, said plurality of input terminals being connected to receive said signals S10, S20, S0E, S3E through S5E; and,
output gating means connected to said output terminal of said logic gating means, to said odd output terminal and to receive said bus parity error signal EBP, said output gating means being conditioned by said logic gating means in response to an error condition to generate said first output signal in response to said signal EBP and said error indicator circuit means generating said second output signal when said parity circuit means forces said odd output terminal to a binary ONE indicating that said syndrome signals contain an odd number of binary ONES.

23. The subsystem of claim 20 wherein said decoder means includes a plurality of decoder circuits whose number is less than the number of said plurality of syndrome signals, each of said plurality of decoder circuits being connected to receive a different combination of predetermined ones of said syndrome signals and said second output signal from said error indicator means and each said decoder circuit having a plurality of output terminals for indicating the presence of said bus parity error and which bits of said bytes are to be corrected.

24. The subsystem of claim 23 wherein said number of said plurality of decoder circuits is three, said each decoder circuit having a plurality of enable input terminals and select input terminals, said enable input terminals being connected to receive said second output signal and a predetermined combination of a first pair of said syndrome signals and said select input terminals being connected to receive a second group of said syndrome signals.

25. The subsystem of claim 24 wherein said first pair of said syndrome signals correspond to signals S0E, S00 and S1E, S10 and said second pair of said syndrome signals correspond to signals S30 through S50.

26. The system of claim 16 wherein said encoder means includes:
a plurality of parity circuits corresponding in number to the number of check bits in said word, each of said plurality of parity circuits being connected to receive a different combination of said data bit bytes and predetermined ones of said parity circuits being connected to receive a bus byte multibyte parity error signal for indicating the presence of a parity error signal in more than one byte, each said parity circuit including a pair of output terminals for indicating complementary states of a predetermined one of said plurality of coded check bits and wherein said means include circuit means connected to a predetermined one of said pair of output terminals of each said parity circuit for applying a predetermined state of each of said coded check bits to said memory.

27. The system of claim 26 wherein said encoder means further includes:
a plurality of parity generator circuits corresponding in number to said plurality of bytes in said word, each parity generator circuit being connected to receive the data and parity bits of a different one of said bytes and operative to generate a different one of said byte parity error signals for indicating the presence of an error in said byte; and,
logic gating means coupled to receive said byte parity error signal from said each parity generator circuit, said logic gating means being operative to logically combine said multibyte parity error signals so as to generate said signal for indicating a parity error in more than one of said bytes.

28. The system of claim 27 wherein said logic gating means includes an OR gate circuit.

29. A data processing system including a plurality of data handling devices, each connected in common to receive and transfer words including a plurality of bytes over a bus network, said system further including a memory subsystem comprising:
a memory for storing said words;
input means coupled to said bus for receiving a number of said words from any one of said data handling devices for storage in said memory during a memory cycle of operation, each said word including a plurality of bytes and at least one of a plurality of parity bit signals each for indicating the validity of one of said bytes;

signal generating means coupled to said input means and to said memory, said generating means including:

a common matrix circuit means being coupled to said memory and operative during a memory write cycle of operation to generate a group of coded check bits in response to said plurality of said bytes and a plurality of parity error signals, said matrix circuit means forcing a predetermined number of said coded check bits to predetermined states when said plurality of said byte parity error signals designate that said bytes are in error;

signal means connected to said generating means and to said input means for applying said bytes and group of coded check bit signals to said memory for said storage during said memory write cycle of operation; and, said matrix circuit means being operative during a memory read cycle of operation to generate a plurality of syndrome signals for locating an error in said bytes, the location of said error being established by said bytes and said coded check bits read out from said memory during a subsequent cycle of operation, said plurality of syndrome signals having a first predetermined characteristic for signalling when said plurality of bytes of a word received from any one of said data handling devices have incorrect parity when initially written into said memory enabling the detection of multibyte parity errors in said words to be deferred until accessed by one of said devices.

30. The system of claim 29 wherein groups of check bits include an even number of bits and wherein said predetermined number of said coded check bits forced to said predetermined states is an odd number.

31. The system of claim 30 wherein said even number of bits is six and said odd number of check bits is three and wherein said number of words is two.

32. The system of claim 29 wherein said common matrix means includes:

a number of groups of parity circuits, said number corresponding to the number of words simultaneously read out during a memory cycle of operation, each group including a plurality of parity circuits corresponding in number to the number of check bits in said word, each of said plurality of parity circuits being connected to receive a different combination of said data bit bytes and predetermined ones of said parity circuits being connected to receive a bus multibyte parity error signal for indicating the presence of a parity error signal in more than one byte, each said parity circuit including a pair of output terminals for indicating complementary states of a predetermined one of said plurality of coded check bits and wherein said means include gating means connected to a predetermined one of said pair of output terminals of each said parity circuit for applying a predetermined state of each of said coded check bits to said memory.

33. The system of claim 29 wherein said signal generating means further includes:

a number of groups of parity generator circuits, said number corresponding to the number of words simultaneously read from said memory during a memory cycle of operation and each said group including a plurality of parity circuits corresponding in number to said plurality of bytes in said word, each parity generator circuit being connected to receive the data and parity bits of a different one of said bytes and operative to generate one of said byte parity error signals for indicating the presence of an error in said byte; and, logic gating means coupled to receive said byte parity error signal from said each parity generator circuit, said logic gating means being operative to logically combine said byte parity error signals so as to generate said multibyte signal for indicating a parity error in more than one of said bytes of one of said number of words.

34. The system of claim 33 wherein said logic gating means includes an OR gate circuit.

35. The system of claim 29 wherein said subsystem further includes logic means for correcting an error in said bytes of one of said words, said logic means being connected to said memory for receiving said bytes of said one word read out from said memory and said plurality of syndrome signals for correcting said error in accordance with the states of said plurality of said syndrome signals.

36. The system of claim 35 wherein said subsystem further includes:

error indicator means connected to said memory and to said common matrix means for receiving selected states of certain ones of said plurality of syndrome signals, said plurality of check bits read out from said memory and a signal indicative of a bus parity error, said indicator means being operative in response to said plurality of syndrome signals to generate a read error signal and logically combine said read error signal with said bus parity error signal to generate a first output signal indicating the presence of said multibyte parity error to said one device and said indicator means being operative when said certain ones of said plurality of syndrome signals and plurality of check bits indicate the presence of an odd number of binary ONES to generate a second output signal indicating the presence of a single bit error condition.

* * * * *